(12) United States Patent
Wilde et al.

(10) Patent No.: US 6,538,974 B2
(45) Date of Patent: Mar. 25, 2003

(54) METHOD AND SYSTEM FOR SUPPRESSING SPURIOUS REFLECTIONS

(75) Inventors: Jeffrey P. Wilde, Los Gatos; Alexander Tselikov, Fremont; Yongwei Zhang, San Jose, all of CA (US); George R. Gray, Apple Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/938,225

(22) Filed: Aug. 22, 2001

(65) Prior Publication Data

US 2002/0172134 A1 Nov. 21, 2002

Related U.S. Application Data

(62) Division of application No. 09/283,896, filed on Mar. 30, 1999, now abandoned.
(60) Provisional application No. 60/079,903, filed on Mar. 30, 1998, provisional application No. 60/088,192, filed on Jun. 5, 1998, provisional application No. 60/108,398, filed on Nov. 13, 1998, and provisional application No. 60/111,470, filed on Dec. 9, 1998.

(51) Int. Cl.[7] .................................................. G11B 7/00
(52) U.S. Cl. ........................... 369/112.01; 369/112.21; 369/112.27; 385/11; 360/114
(58) Field of Search ..................... 360/114; 369/110.02, 369/112.01, 112.21, 112.23, 112.27, 112.29, 121; 385/11

(56) References Cited

U.S. PATENT DOCUMENTS

| 5,164,956 A | * | 11/1992 | Lang | 372/96 |
| 5,245,491 A | * | 9/1993 | Horie | 360/114 |
| 5,619,488 A | * | 4/1997 | Ota | 369/112 |
| 5,909,425 A | * | 6/1999 | Suyama | 369/121 |

* cited by examiner

*Primary Examiner*—Cassandra Spyrou
*Assistant Examiner*—Leo Boutsikaris
(74) *Attorney, Agent, or Firm*—Simon & Koerner LLP; Nancy R. Simon

(57) ABSTRACT

An optical system and method for selective transmission of light between a source of light and set of storage disks along an optical path includes at least one polarization maintaining optical fiber optical fiber. Various noise reduction techniques are provided by substantially decreasing or eliminating spurious reflections (or the effects thereof) at end faces and of an optical fiber. In particular, various techniques, such as index matching, a cover slip method, or laser modulation, may be used to eliminate spurious reflections (or the effects thereof) at the front end face of the optical fiber. Various techniques, such index matching or multi-mode fiber splicing, may be used to eliminate spurious reflections (or the effects thereof) at the end face of the optical fiber.

33 Claims, 7 Drawing Sheets

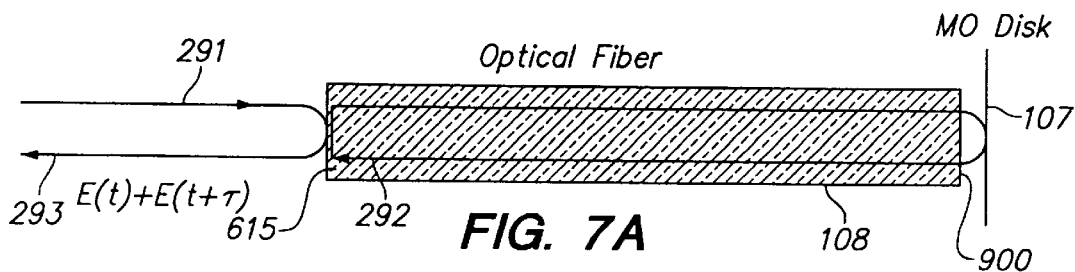
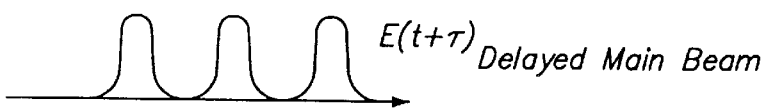
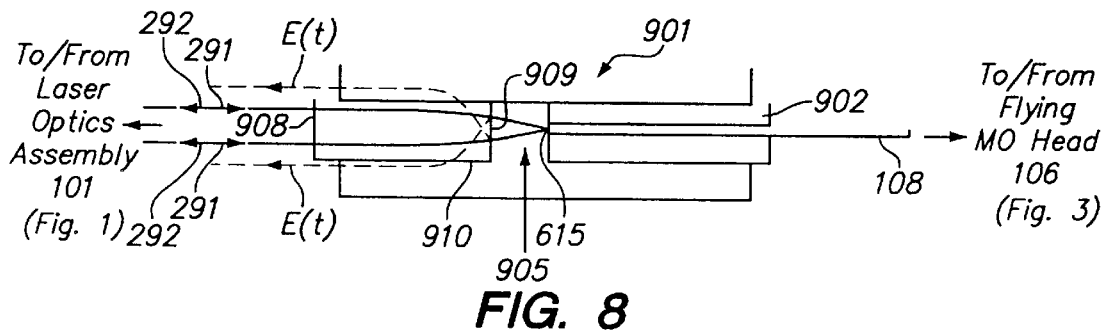
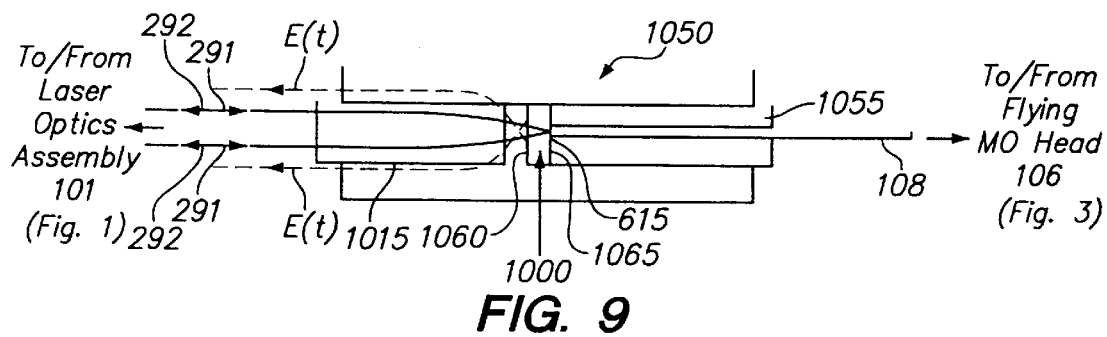
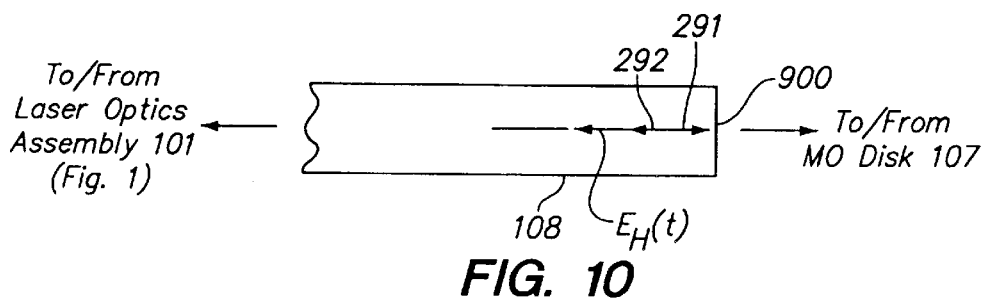

METHOD AND SYSTEM FOR SUPPRESSING SPURIOUS REFLECTIONS

This patent application is a divisional of commonly assigned U.S. patent application Ser. No. 09/283,896, filed Mar. 30, 1999, now abandoned, which claims the benefit of U.S. Provisional Application No. 60/079,903 filed Mar. 30 1998, U.S. Provisional Application No. 60/088,192 filed Jun. 5 1998, U.S. Provisional Application No. 60/108,398 filed Nov. 13 1998, and U.S. Provisional Application No. 60/111,470 filed Dec. 9 1998, all of which are incorporated herein by reference.

BACKGROUND

1. Technical Field

The present invention relates generally to optical fibers for use in data storage systems. More particularly, the present invention relates to the suppression of spurious reflections in magneto-optical data storage systems.

2. Description of the Prior Art

In today's technological society, as the amount of information continues to grow, storage and retrieval of information will play an increasingly important role. In a particular information storage technology known as magneto-optical (MO) data storage and retrieval, a long term goal continues to be improved access to this information. Information access includes the use of a polarized laser light source for reading and/or writing information at a mark of interest on an MO disk. In the case of reading information, MO technology makes use of a magneto-optical effect ("Kerr" effect) to detect a polarization rotation imposed on a linearly polarized incident laser beam by a surface recording layer at the mark of interest. The polarization rotation (representing the information stored at the mark of interest) is embodied in a reflection of the linearly polarized laser beam and is converted by electronics for readout. Consequently, to accurately read stored information from an MO disk, the polarization orientation of the reflected laser beam should be faithfully conveyed from the MO disk to the readout electronics.

In one proposal, S. Renard and S. Vallette (SPIE Vol. 1499, Optical Data Storage 1991, pp. 238–247) disclose an MO head design that requires three optical fibers to read and write information. Renard's MO head design is undesirably complex, primarily because of the large number of optical and compensating elements used in its implementation.

In an approach that uses polarization maintaining (PM) optical fiber, the intrinsic properties of the fiber can be made to preserve the optical polarization as required for MO recording. Because PM optical fiber generally exhibits birefringence, (i.e., a different refractive index that different polarization orientations experience), external stresses or temperature variations may function to induce unwanted phase fluctuations between the two polarization modes of the PM optical fiber. Consequently, any information conveyed by the polarization rotation as it propagates through the PM optical fiber may also be affected. A proposal for passively eliminating phase fluctuations caused by the properties of PM optical fiber is discussed by M. N. Opsasnick in SPIE Vol. 1499, Optical Data Storage 1991, pp. 276–278. As in the design of Renard and Vallette, the Opsasnick MO head and actuator arm design is limited by its physical size, mass, and the number of optical elements required. In general, the greater the number and mass of the optical elements used to access information in an MO data storage and retrieval system, the slower the speed at which the information may be accessed, the lower the tracking bandwidth becomes, and the lower the track density that may be read or written.

A drawback of PM fiber relates to the undesired laser noise that arises due to spurious reflections from a front end face and/or back end face of a fiber in a magneto-optical data storage and retrieval system. In particular, the undesired laser noise occurs when the spurious reflection co-propagates with a reflected laser beam and when the spurious reflection and the reflected laser beam assume approximately the same spatial distribution, thereby degrading the signal-to-noise ratio (SNR) of the Kerr signal.

A third approach to data storage based on flying head optical technology with free-space optical propagation to and from the head is proposed by N. Yamada (U.S. Pat. No. 5,255,260). In particular, Yamada discloses an optical head arrangement that requires one stationary laser/detector package per head, with the head placed on a linear actuator for movement across a disk surface. Yamada does not address the problems associated with vertical runout of the disk or the associated degradation of the optical spot size. Although Yamada provides access to a plurality of phase change optical disks, the number of optical disks that may be operated within a given volume, as well as the performance characteristics associated with the optical disks, is inherently limited by the excessive number, size, and cost of the required optical and mechanical components.

What is needed is an optical system and method that improves upon conventional efforts directed towards data access. What is also needed is an optical system that can reduce head weight and size, improve disk access time, require fewer optical components, increase the number of storage disks that may be operated within a given volume, and be inexpensive and easy to manufacture. In addition, there is a need for an optical system that can transmit light between a laser source and a storage location of an optical drive with a sufficient signal to noise ratio (SNR).

SUMMARY

In accordance with the present invention, there is provided a low noise apparatus and method for transmitting optical information between a laser source and a storage location. The low noise apparatus and method advantageously reduce head weight and size, provide a set of low profile optical paths, improve information access times, require fewer optical components, and increase the storage capacity available within a given volume, as compared to conventional approaches.

In accordance with the present invention, optical information is transmitted along an optical path that includes a first optical fiber located between the laser source and a selected storage location. Alternatively, optical information is transmitted along an optical path selected from a set of optical paths that includes the first optical fiber and a set of second optical fibers. In one embodiment, the optical paths are confocal optical paths, the storage location includes a set of magneto-optical storage disks, and the optical fibers are single-mode polarization maintaining (PM) optical fibers. Each of the optical paths may be coupled along a respective positioning arm to a respective flying magneto-optical head. The respective positioning arms are, for example, rotary actuator arms. Each of the optical paths is typically positioned by its respective rotary actuator arm so as to selectively access a reflection of the source of polarized light from a selected magneto-optical disk. The set of optical paths may further include an optical switch that selectively routes information between a fixed optical module (containing the source of polarized laser light along with a photodetection means) and the set of magneto-optical storage disks.

In another aspect of the present invention, various noise reduction techniques are provided by substantially decreasing or eliminating spurious reflections (or the effects thereof) at the end faces of the optical fiber. These noise reduction techniques may be applied if the laser source is, for example, a Fabry-Perot (FP) laser or a stable single-frequency laser source such as a distributed feedback (DFB) laser. In particular, spurious reflections (or the effects thereof) may be eliminated at the fiber front (launch) end face near the laser source and at the fiber back (head) end face near the storage media.

To eliminate the effects of a spurious reflection from the fiber front end face, the laser source may be modulated at a particular frequency that depends on the length of the optical fiber. As a result, the spurious reflection from the fiber front end face is time-separated from the main signal-bearing beam returning from the storage media.

In another embodiment in accordance with the present invention, the spurious reflection from the fiber front end face is eliminated by coupling the fiber front end face to a material having a refractive index equal to the refractive index of the core of the optical fiber. The material may, for example, be formed from epoxy, fluid, or other suitable materials.

In another embodiment in accordance with present invention, the spurious reflection from the fiber front end face is eliminated by coupling the fiber front end face to a cover slip having a refractive index equal to the refractive index of the core of the optical fiber. The cover slip may, for example, be formed from glass or other suitable materials.

In another embodiment in accordance with the present invention, the spurious reflection from the fiber back end face is eliminated by coupling the fiber back end face to a fluid or epoxy having a refractive index equal to the refractive index of the core of the optical fiber.

In another embodiment in accordance with the present invention, the spurious reflection from the fiber back end face is eliminated by coupling the fiber back end face to a coreless or multi-mode fiber portion having a refractive index equal to the refractive index of the core of the optical fiber. The coupling of the fibers is carried out, for example, by fusion splicing.

BRIEF DESCRIPTION OF THE DRAWINGS

FIG. 7 illustrates an optical system in which a laser source is pulsed, in accordance with an embodiment of the present invention;

FIG. 8 is an illustration of an optical fiber coupled to a GRIN lens with an index matching material, in accordance with another embodiment of the present invention;

FIG. 9 is an illustration of an optical fiber coupled to a GRIN lens with a cover slip bonded to the fiber, in accordance with another embodiment of the present invention;

FIG. 10 is an illustration of a portion of an optical fiber wherein a spurious reflection occurs at the head end of the optical fiber;

FIG. 13b illustrates the propagation of the signal-bearing beams and the spurious reflection in the optical system illustrated in FIG. 13a.

DETAILED DESCRIPTION

Figure 1:
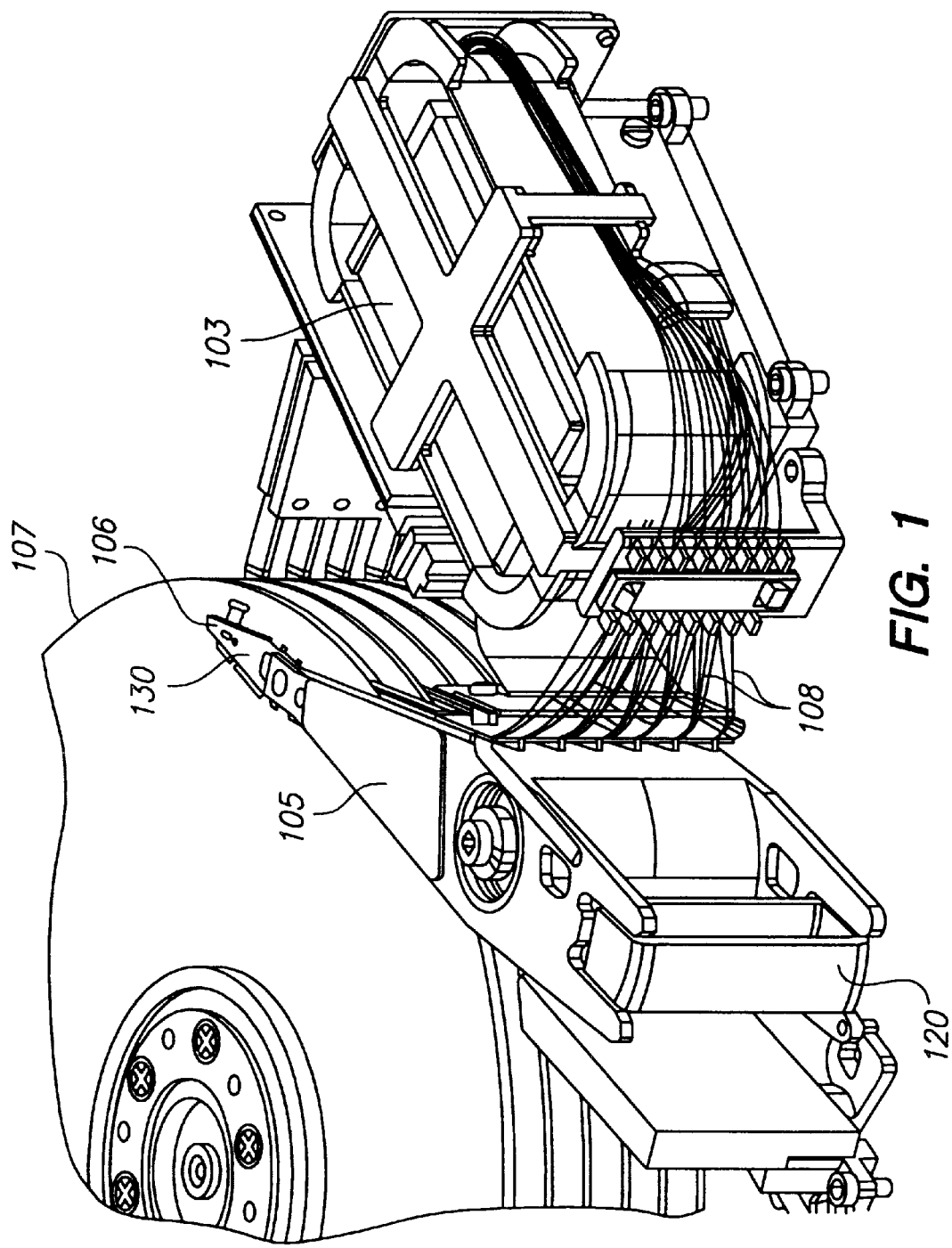
FIG. 1 is a diagram showing a magneto-optical data storage and retrieval system.

FIG. 1 is a diagram showing a magneto-optical data storage and retrieval system that can implement the present invention. In one embodiment, the magneto-optical (MO) data storage and retrieval system 100 includes a set of Winchester-type flying heads 106 that are adapted for use with a set of spinning MO disks 107 (one head for each MO disk surface). The flying heads 106 (hereinafter referred to as MO heads 106) are coupled to a rotary actuator magnet and coil assembly 120 by a respective suspension 130 and actuator arm 105 for positioning the set of MO heads 106 over the surfaces of the set of spinning MO disks 107. In operation, lift forces are generated by aerodynamic interactions between the set of MO heads 106 and the spinning MO disks 107. The lift forces are opposed by equal and opposite spring forces applied by the set of suspensions 130. The set of MO heads 106 may be maintained at a predetermined flying height above and below both surfaces of the set of spinning MO disks 107. The system 100 is typically designed in such a way that under normal operating conditions the set of MO heads 106 never directly contact the set of spinning MO disks 107.

The system 100 further includes a laser optics module 103 comprising a laser-optics assembly 101, an optical switch 104, and a set of optical elements 108 such as single-mode PM optical fibers. In one embodiment, each of the set of single-mode PM optical fibers 108 are respectively coupled to the set of actuator arms 105 and the set of suspensions 130, ending in a respective connection at a respective one of the set of MO heads 106. As will be discussed shortly, the PM optical fibers 108 provide a set of low-profile and low-mass optical paths that improve the data storage capacity per unit volume of system 100 as compared to conventional approaches, while maintaining fast seek and data transfer rates.

Figure 2:
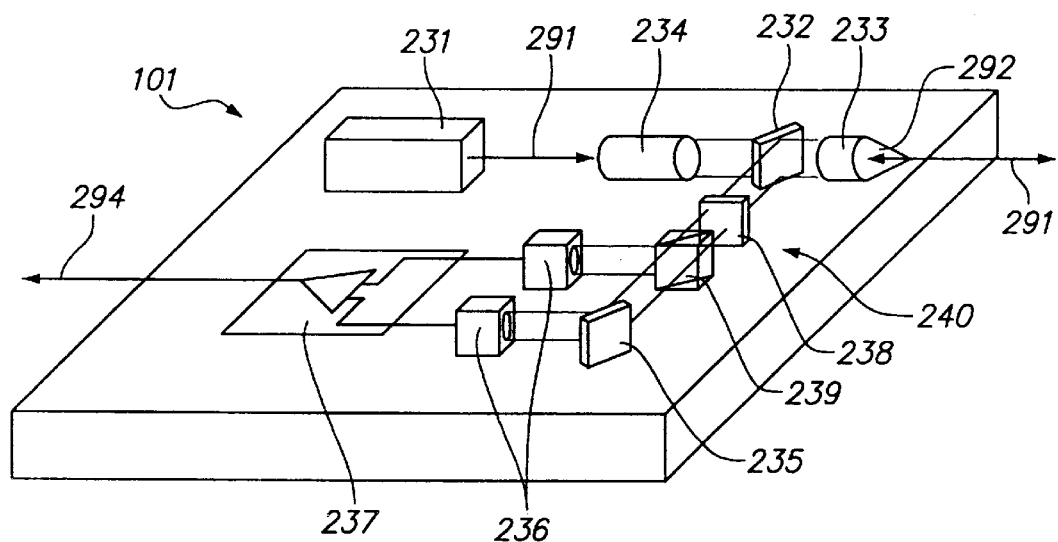
FIG. 2 is a diagram showing the laser-optics assembly of the magneto-optical data storage and retrieval system of FIG. 1.

FIG. 2 is a diagram showing the laser-optics assembly of the magneto-optical data storage and retrieval system of FIG. 1. In FIG. 2, the laser-optics assembly 101 is shown to include a linearly polarized laser source 231 operating in a visible or near ultraviolet region and emitting an optical power in the range from approximately 30 to 50 mw. The laser-optics assembly 101 further includes: collimating optics 234, a low dispersion leaky beam splitter 232, and a coupling lens 233. The laser-optics assembly 101 directs a linearly polarized outgoing laser beam 291 from the linearly polarized laser source 231 towards a proximal end (launch end) 615 of a single-mode PM optical fiber 108 for delivery of the outgoing laser beam 291 to a selected one of the set of spinning MO disks 107. Laser-optics assembly 101 further includes: a ¼-wave plate 238, a mirror 235, and a polarizing beam splitter 239. A reflected laser beam 292 from the spinning MO disk 107 exits the single-mode PM optical fiber 108 at the proximal end 615, is collimated by the coupling lens 233, and is routed by the leaky beam splitter 232 to a differential detector 240 comprising: the ¼-wave plate 238, the mirror 235, and the polarizing beam splitter 239. This type of differential detection scheme measures the optical power in the two orthogonal polarization components of the reflected laser beam 292, with the differential signal being a sensitive measure of polarization rotation induced by the Kerr effect at the surface of a spinning MO disk 107 at readout. After optical-to-electrical signal conversion by a set of photodiodes 236, the differential signal is processed by the differential amplifier 237 and is output as signal 294. The differential detector 240 measures the optical power of the orthogonal S and P polarization components of the reflected laser beam 292, with a differential signal being preferably a sensitive measure of polarization rotation induced by a Kerr effect at the surface of the particular MO disk 107. While a preferred embodiment includes one conventionally known arrangement of optical components embodied as the laser-optics assembly 101, the present invention is not meant to be limited to this arrangement, as other techniques for directing the linearly polarized outgoing laser beam 291 and for detecting the linearly polarized reflected laser beam 292 are conventionally known.

Figure 3:
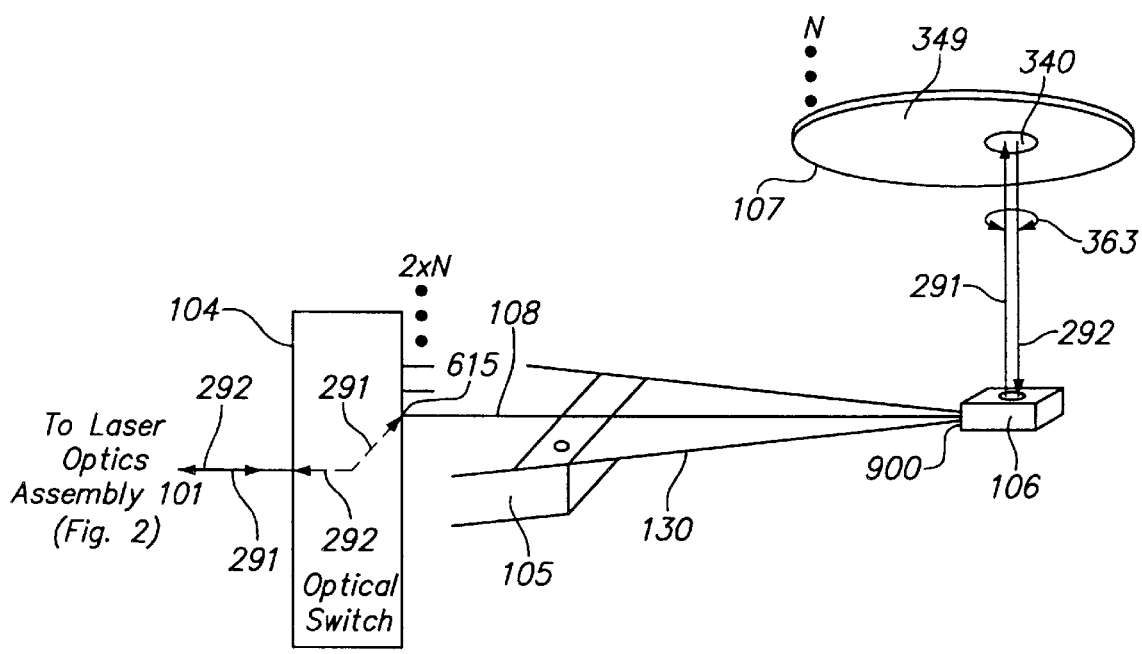
FIG. 3 is a diagram showing an optical path that includes the optical fiber and the optical switch of the magneto-optical data storage and retrieval system of FIG. 1.
Figure 4A:
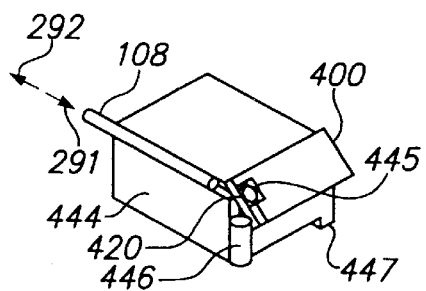
FIGS. 4a–4g illustrate one embodiment of the flying magneto-optical head of the magneto-optical data storage retrieval system of FIG. 1.
Figure 4B:
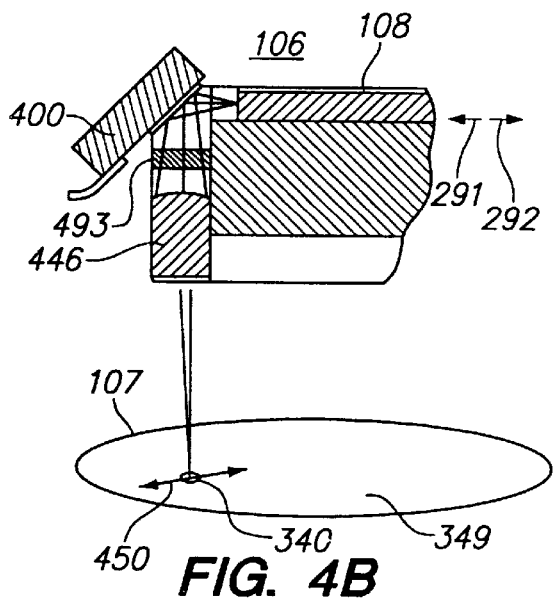
Figure 4C:
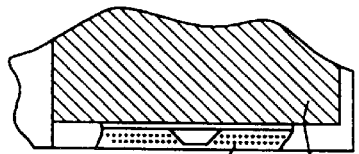
Figure 4D:
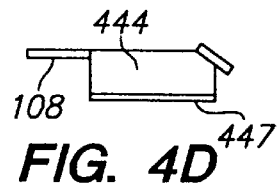
Figure 4E:
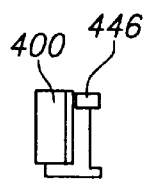
Figure 4F:
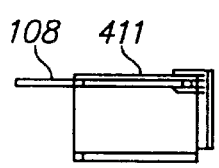
Figure 4G:
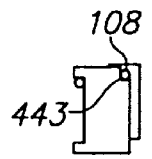
Figure 5A:
FIG. 5 illustrates an alternative embodiment of the flying magneto-optical head of the magneto-optical data storage and retrieval system of FIG. 1.
Figure 5B:
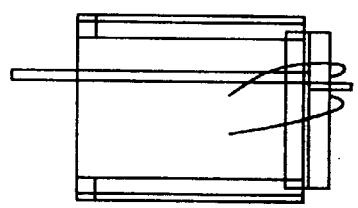
Figure 5C:
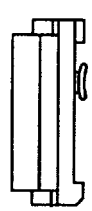
Figure 5D:
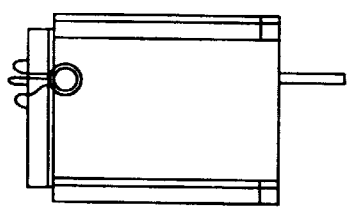
Figure 5E:
Figure 5F:
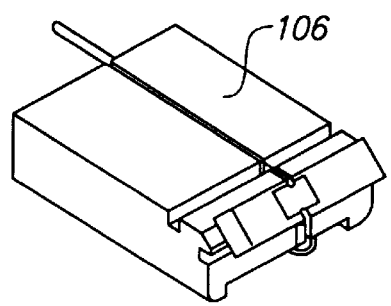

FIG. 3 is a diagram showing an optical path that includes the optical fiber and the optical switch of the magneto-optical data storage and retrieval system of FIG. 1. The set of optical paths in accordance with the present invention may be described with reference to a single optical path, shown in FIG. 3 to include: the optical switch 104, one of the set of single-mode PM optical fibers 108, and one of the set of MO heads 106. In one embodiment, the outgoing linearly polarized laser beam 291 from the laser-optics assembly 101 propagates towards a respective proximal end (i.e., respective launch end) 615 of the single-mode PM optical fiber 108. The outgoing linearly polarized laser beam 291 is further directed to exit a respective distal end (i.e., respective head end) 900 of the single-mode PM optical fiber 108 for transmission through the MO head 106 to a surface recording layer 349 of the respective spinning MO disk 107. The optical switch 104 provides sufficient degrees of selectivity for directing laser beams 291 and 292 between the laser optics assembly 101 and the set of single-mode PM optical fibers 108. The optical switch 104 may be implemented by using conventional micro-mechanical, electro-optical, and/or thermo-optical technologies or the like.

During the writing of information, the linearly polarized outgoing laser beam 291 is selectively routed by the optical switch 104 to the spinning MO disk 107 so as to lower a coercivity of the surface recording layer 349 by heating a selected spot of interest 340 in a range from, for example, approximately 150 degrees Centigrade to approximately 250 degrees Centigrade depending on the Curie point of the MO recording layer 349. In one embodiment, the optical intensity of linearly polarized outgoing laser beam 291 is held constant, while a time varying vertical bias magnetic field is used to define a pattern of "up" or "down" magnetic domains perpendicular to the spinning MO disk 107. This technique is known as magnetic field modulation (MFM). Alternatively, outgoing laser beam 291 may be modulated in synchronization with the time varying vertical bias magnetic field at the spot of interest 340 in order to better control domain wall locations and reduce jitter. Subsequently, as the selected spot of interest 340 cools at the surface layer 349, information is encoded at the surface of the respective spinning disk 107 as a pattern of "up or down" magnetic domain polarities.

During the readout of information, the linearly polarized outgoing laser beam 291 (at a lower power compared to writing) is selectively routed to the respective spinning MO disk 107, such that upon its reflection from the spot of interest 340, the Kerr effect causes a polarization state of the reflected laser beam 292 to be rotated either clockwise or counter-clockwise (as indicated with arrow 363). The aforementioned optical path is bi-directional in nature. Accordingly, the reflected laser beam 292 is received through the MO head 106 and enters the distal end 900 of the single-mode PM optical fiber 108, propagates along the single-mode PM optical fiber 108 to exit at its proximal end, is selectively routed by the optical switch 104 toward the laser optics assembly 101 for subsequent optical-to-electrical signal conversion.

FIGS. 4a–4g illustrate an embodiment of the flying magneto-optical head of the magneto-optical data storage and retrieval system of FIG. 1. For purposes of explaining the functionality of the present invention, the set of flying MO heads are illustrated by reference to a single representative MO head 106, which is shown in the detailed views of FIGS. 4 as a flying MO head 106 for use below a surface recording layer 349 of one of the set of MO disks 107. In one embodiment, the flying MO head 106 includes: a slider body 444, an air bearing surface 447, a quarter-wave plate 493, a reflective substrate 445, objective lens 446, and a magnetic coil 460. The slider body 444 is preferably dimensioned according to mechanical and optical constraints that include: physical size, numerical aperture (NA), and working distances between the objective lens 446, the single-mode PM optical fiber 108, and the reflective substrate 445. The reflective substrate 445 may comprise a reflective surface that is aligned at an angle of approximately 45 degrees relative to the air bearing surface 447 and may include a steerable micro-machined mirror. An example of a suitable steerable micro-machined mirror assembly is described in commonly-assigned U.S. patent application Ser. No. 08/844,207, which is incorporated herein by reference in its entirety. While slider body 444 may be dimensioned as an industry standard "mini", "micro", "nano", or "pico" slider, alternatively dimensioned slider bodies 444 may also be used as determined by the aforementioned mechanical and optical constraints. Accordingly, in one embodiment, slider body 444 comprises a mini slider height (approximately 889 microns) and a planar footprint area corresponding to that of a nano slider (approximately 1600×2032 microns).

In one embodiment, a single-mode PM optical fiber 108 is coupled to an axial cutout 443 along an edge of the slider body 444, and the objective lens 446 is coupled to a vertical cutout 411 along a corner of the slider body 444. While the axial cutout 443 is preferably located along a periphery of the slider body and the vertical cutout 411 is located at a corner of the slider body 444, the axial cutout 443 and the vertical cutout 411 may be located at other positions on the flying MO head 106, for example as shown in the detailed views of FIG. 5, between the periphery and a central axis and towards a first end more generally than a second end, respectively. The positioning the optical fiber 108 and the objective optics 446, at other than along a central axis, may function to affect a center of mass of the magneto-optical head 106 and, thus, its flying dynamics. Accordingly, the point of attachment of the MO head 106 to the suspension may require adjustment to compensate for off-center changes in the center of mass of the magneto optical head 106. Preferably, the cutouts 443 and 411 may be designed as channels, v-grooves, or any other suitable dimensions for coupling and aligning the single-mode optical fiber 108 and objective optics 446 to the flying MO head 106. In one embodiment, the laser beams 291 and 292 traverse an optical path (to and from the surface recording layer 349 of the MO disk 107) that includes: the single-mode PM optical fiber 108, the reflective substrate 445, the quarter-wave plate 493, and the objective lens 446. The single-mode PM optical fiber 108 and the objective optics 446 may be positioned within their respective cutouts to achieve focus of the outgoing laser beam 291 within the spot of interest 340 as a focused optical spot 448. The single-mode PM optical fiber 108 and the objective optics 446 may be subsequently secured in place by using ultraviolet curing epoxy or similar adhesive. In one embodiment, the objective lens 446 comprises a micro plano-convex GRIN (Graded Index) lens that has a diameter of approximately 0.254 microns and a numerical aperture (NA) in the range of approximately 0.6–0.85.

In MO recording, since polarization information from the MO disk 107 is desired to be read, it is important that polarization noise be kept to a minimum. As will be discussed below, various noise reduction techniques are provided for substantially decreasing or eliminating spurious reflections (or the effects thereof) at the end faces of an optical fiber 108. These noise reduction techniques may be applied if the laser source is, for example, FP or DFB.

The reflective substrate 445, quarter-wave plate 493, and objective lens 446 are preferably compact and low mass so as to fit within a physical volume approximating the rectangular volumetric dimensions of the slider body 444 and yet sufficiently large to direct a full cross section of the outgoing laser beam 291 and reflected laser beam 292 so that minimal power is lost and significant distortion and aberrations in the outgoing laser beam 291 and reflected laser beam 292 are not introduced.

While the objective lens comprising the GRIN lens 446 has been described as a single element objective lens, additional objective optics may also be used to enhance the properties of the GRIN lens 446. For example, the objective optics may include either an aplanatic lens or a solid immersion lens in conjunction with the GRIN lens 446. Use of such an additional lens element achieves a larger numerical aperture and hence a smaller focused optical spot size. A smaller spot size would preferably increase higher areal data densities to be written to and read from the MO disk 107. Micro-optic lenses made by molding glass or plastic may also be used in place of the GRIN lens 446. For example, two molded plano-convex aspherical lens may be combined by placing the two convex surfaces toward one another to provide a miniature lens system with high numerical aperture and good off-axis performance. In a dual aspherical optical design, light would be approximately collimated between the two optical elements, thus, the quarter wave plate 493 could be placed between the two elements without requiring additional lenses. In another embodiment, a single molded spherical lens with low numerical aperture (approximately 0.2–0.4) may be used in conjunction with an aplanatic or solid immersion lens to yield an optical focusing system with relatively high numerical aperture (greater than approximately 0.6). From a manufacturing perspective, molded lenses are attractive because they can be produced in high volume at low cost. One method disclosed here for mass production involves molding a lens array and subsequently sectioning of the array by diamond saw cutting or laser cutting to obtain individual lenses. Regarding the aforementioned two-lens design, two molded plano-convex lens arrays may be mated by means of tapered fittings before sectioning to ensure accurate lens alignment.

The reflective substrate 445 may comprise a steerable micro-machined mirror. As used in the magneto-optical storage and retrieval system 100, fine tracking and short seeks to adjacent tracks are performed by rotating a reflective inner mirror plate portion 420 of the reflective substrate 445 about a rotation axis so that the propagation angle of the outgoing laser beam 291 is changed before transmission to the objective optics 446. The reflective inner mirror plate portion 420 is rotated by applying a differential voltage to drive electrodes. The differential voltage on the electrodes creates an electrostatic force that rotates the reflective inner mirror plate portion 420 about torsional hinges, enabling the focused optical spot 448 to be scanned with an angular deflection, which in an exemplary embodiment comprises approximately +/−2 degrees or equivalently approximately +/−4 tracks on the MO disk 107, back and forth in a direction 450 that is approximately parallel to the radial direction of the MO disk 107. Consequently, movement of the focused optical spot 448 across the MO disk 107 and detection of the reflected laser beam 292 may be used in storage and retrieval of information, track following, and seeks from one data track to another data track. Coarse tracking may be maintained by adjusting a current to rotary actuator magnet and coil assembly 120. The track following signals used to follow a particular track on the MO disk 107 may be derived using combined coarse and fine tracking servo techniques that are well known in the art. For example, a sampled sector servo format may be used to define tracks. The servo format may include either embossed pits stamped into the MO disk 107 or magnetic domain orientations that are read similar to data marks. If embossed pits are used, an adder output circuit may be used to supplement the differential output circuit 237 (FIG. 2). Conventional Winchester magnetic disk drives using more than one magnetic disk use a set of respective suspensions and actuator arms that move in tandem as one integral unit; therefore, during track following using a particular magnetic disk surface, simultaneous track following of other magnetic disk surfaces is not possible. Accordingly, in conventional approaches, writing or reading of information cannot occur to more than one disk surface at a time. In contrast, irrespective of the movement of the set of actuator arms 105 and set of suspensions 130, use of steerable micro-machined mirrors with the set of flying MO heads 106 in accordance with the present invention permits independent track following and seeks and thus independent reading and/or writing of information to more than one disk surface at a time. In such a system (not shown), separate laser-optics assemblies 101, read channel and fine track electronics, and mirror driving electronics would preferably be required for each flying MO head 106.

Figure 6A:
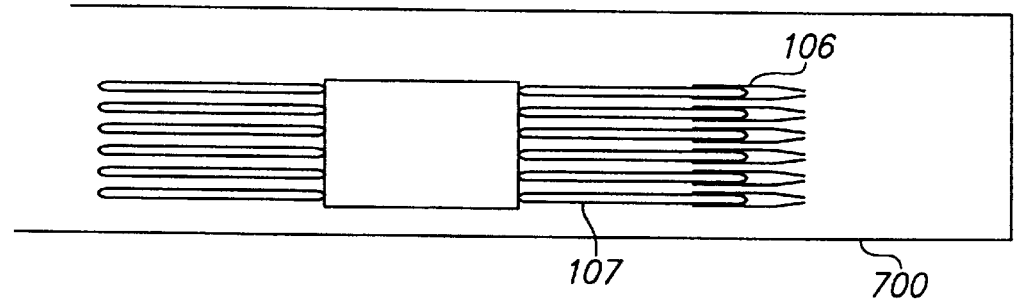
FIG. 6 is a diagram showing a magneto-optical data storage and retrieval system as part of a magneto-optical disk drive.
Figure 6B:
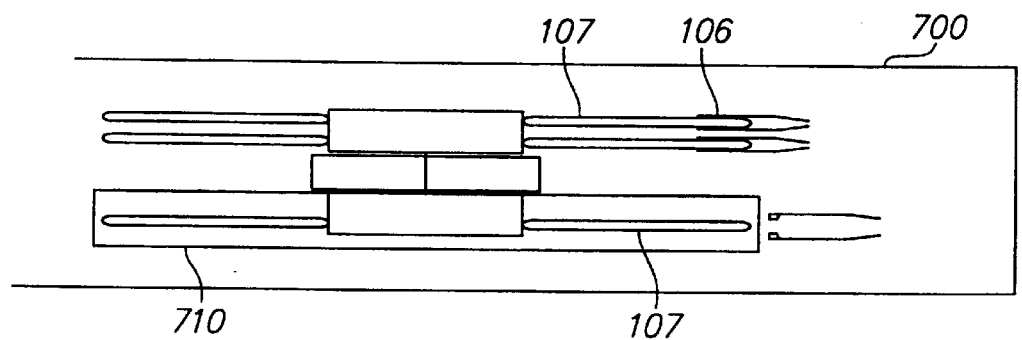

FIG. 6 is a diagram showing a magneto-optical data storage and retrieval system as part of a magneto-optical disk drive. The present invention may be used with a compact high-speed and high-capacity MO disk drive 700 that is an industry standard half-height form factor and that includes: six 5.25 inch internal spinning MO disks 107 and twelve flying MO heads 106. The optical paths formed by individual optical fibers 108 function as a set of low profile and low mass optical paths, enabling MO disk drive 700 to access information faster and more efficiently than the conventional approaches. The MO disk drive 700 may contain a higher volumetric storage density than permitted in an equivalent volume of a conventional disk drive.

Alternatively, the half-height form factor (1.625 inch) MO disk drive 700 may include a removable MO disk cartridge portion 710 and two fixed internal spinning MO disks 107. By providing the removable MO disk cartridge portion 710, the fixed internal and removable combination permits external information to be efficiently delivered to the MO disk drive 700 for subsequent transfer to the internal spinning MO disks 107. The copied information may subsequently be recorded back onto the removable MO disk cartridge portion 710 for distribution to other computer systems. In addition, the removable MO disk cartridge portion 710 allows for very convenient and high-speed back-up storage of the internal MO spinning disks 107. The fixed internal and removable combination also permits storage of data files on the removable MO disk cartridge portion 710 and system files and software applications on the internal MO spinning disks 107. In another alternative embodiment (not shown), an MO disk drive 700 may include any number of spinning MO disks 107 and/or any number of removable MO disk cartridge portions 710.

In one embodiment information is selectively conveyed to and from a laser-optics assembly 101 along an optical path that includes an optical switch 104 and a selected one of the set of single-mode PM optical fibers 108. In an alternative embodiment that conveys information between a set of respective individual laser-optics assemblies 101 and a set of respective MO spinning disks 107, the optical switch 104 would not necessarily be required. The use of rotary actuator arms is not necessarily required, since linear actuator arms, for example, may be used. The low profile optical paths disclosed above may be used to convey information to and from the spinning MO disks 107 without necessarily requiring inclusion of the objective lens 446 and/or reflective surface (substrate) 445 (FIG. 4a), such as in an optical path that directly accesses information from a spinning MO disk 107 at a distal end of a single mode PM optical fiber (e.g. using a tapered optical fiber or optical fiber with lens formed on the distal end).

The embodiments in accordance with the present invention are not necessarily limited to use with flying head technology. While the present invention is described as being used in an MO disk drive 700, use of optical fiber technology, as described with reference from FIGS. 1 to FIGS. 13c, is applicable to information transfer using other technologies, including compact disks (CDs), digital video disks (DVD), and communication systems.

Fiber End Face Reflections

Undesired laser noise can arise when spurious reflections, particularly those from conjugate points in the optical system, interfere with the signal -bearing reflected laser beam 292 (FIG. 3). The conjugate points include the front end face (launch end 615) and back end face (head end 900) of the fiber 108. In particular, undesired laser noise occurs when the spurious reflection from a conjugate point co-propagates with the reflected signal-bearing laser beam 292 into the differential detector 240 (FIG. 2) and when the spurious reflection and the reflected laser beam 292 assume approximately the same spatial distribution. Thus, the spurious reflections of primary concern herein are those with a wavefront that spatially overlaps quite closely with the reflected laser beam 292 from the recording layer 349 of MO disk 107.

RF Modulation for Reducing the Effects of Fiber Launch end 615 Reflections

As similarly stated above, it has been identified that spurious reflections from the proximal ends (launch ends) 615 of the set of optical fibers 108 may degrade SNR, whereby the reflected beam 292 (FIG. 7) may co-propagate together with beam 291 (FIG. 7) from the proximal fiber end 615, thereby resulting in a net reflected beam 293 (FIG. 7) comprising E(t) +E(t+$\tau$). In such a case, the laser source 231 may be, for example, a Fabry-Perot (FP) type that is pulsed on and off with a duty cycle of about 50% or less and with a modulation frequency in the range from approximately 200 MHz to approximately 1.0 GHz. Pulsing the FP laser at increasingly higher frequencies (e.g., up to the relaxation oscillation frequency of the laser) causes the mode partition noise level in the optical system to progressively decrease since the laser mode partition dynamics change at higher frequencies. Pulsing of the laser 231 also allows the reflected pulses of beam 293 to be time separated from the main signal-bearing beam 292, thereby reducing interference between the two pulse trains and thus effectively increasing the SNR of the detected Kerr signal. In the event that the two beams are allowed to overlap in time and interfere, then mode partition noise and laser phase noise could arise.

Therefore, the laser source 231 may be modulated to reduce noise in the optical system by time-separating the spurious reflection E(t) (from fiber launch end 615) and the signal-bearing reflection 292 (from MO disk 107). As a result, the interference between the two reflected beams is reduced, thereby increasing the SNR of the Kerr signal detected by differential detector 240 (FIG. 2). It is noted that the laser source 231 may alternatively be a stable single-frequency laser source such as a distributed feedback (DFB) type that is pulsed in a manner as similarly described above.

In one embodiment, with an optical fiber 108 index of refraction of about 1.5, the length of each of the optical fibers 108 is selected to be about 71.35 mm for a modulation frequency of approximately 350 MHz. The relationship between the modulation frequency (F) and the length (L) of the optical fibers 108 is embodied in the equation: F=(2i+1)/4Ln where i–0,1,2, . . . , c=speed of light in vacuum, and n=refractive index of the fiber. The length of the set of optical fibers 108 is selected to ensure a proper time separation of the pulse trains. It is understood that in other embodiments, the length of the optical fiber 108 can be selected in accordance with other indices of refraction and other pulsing frequencies and, thus, the present invention should be limited only by the scope of the claims.

In accordance with the present invention, additional techniques are now discussed for eliminating the effects of the spurious reflection from the launch end 615 of optical fiber 108.

These additional techniques include index matching and a cover slip technique. These additional techniques may be performed by use of a laser source 231 that may be, for example, a FP laser or a stable single-frequency laser source such as a DFB laser.

Index Matching for Reducing the Effects of Fiber Launch end 615 Reflections

An index matching approach may also be used to reduce the effects of the spurious reflection from the launch end 615 of the optical fiber 108. In one embodiment, the fiber 108 (or fiber bundle) is coupled to a GRIN lens 910 to form a collimator (container) 901, as shown in FIG. 8. An index-matching material 905 fills a gap between the GRIN lens 910 and the fiber 108. A capillary 902 supports the optical fiber 108 in the collimator 901. The GRIN lens 910 is used to focus the incident laser beam 291 into the fiber core via launch end 615 of optical fiber 108 and may have a pitch of, for example, approximately 0.23. The index-matching material 905 has a refractive index that is equal or nearly equal to the refractive index of the core of optical fiber 108, thereby eliminating or substantially reducing the Fresnel reflection from the surface of launch end 615 as well as from the inner GRIN lens surface 909 (to the extent that the GRIN lens refractive index is substantially close to the index of the fiber 108). The index-matching material 905 may comprise, for example, an optical epoxy, gel, or fluid. To the extent that the refractive index of the core of the fiber 108 does not match the refractive index of the index matching material 905, a difference in the refractive indices of $\Delta n = \pm 0.05$ may be tolerated between the fiber 108 core and the index matching material 905, thereby resulting in a maximum interface reflectivity of approximately 0.03%. Preferably, the index-matching material 905 has a high optical quality to prevent aberrations or scattering. In addition, the air-incident surface 908 of GRIN lens 910 is preferably coated with an anti-reflection (AR) coating to further minimize reflection. The AR coating is, for example, any suitable thin-film dielectric stack for reducing reflections.

It is noted that some amount of reflection from the outgoing laser beam 291 may still occur at the air-incident surface 908 even if this surface is AR-coated. If the outgoing laser beam 291 hits the air-incident surface 908 at perfectly normal incidence, then the reflection of the outgoing laser beam 291 at the surface 908 could overlap with the reflected signal-bearing beam 292. However, the probability is slim that the outgoing laser beam 291 will hit the surface 908 at perfectly normal incidence. Typically, in the various embodiments disclosed herein, the outgoing laser beam 291 will hit the surface 908 at some angle of incidence as a result of the following. In order to properly focus or direct the laser beam 291 toward each associated launch end 615 of each fiber 108 in a fiber bundle in the optical system of FIG. 8, the laser beam 291 will hit the air-incident surface 908 with some angle of incidence. The laser beam 291 will hit the air-incident surface 908 at different angles of incidence depending on the coordinate of a particular launch end 615 that receives the laser beam 291.

As shown in FIG. 8, the index-matching material 905 causes the spurious reflection E(t) to not occur at the fiber launch end 615. The spurious reflection E(t) will instead occur at non-conjugate surface 909 at the interface between the index-matching material 905 and the GRIN lens 910 to the extent that a refractive index difference occurs at this surface 909. As a result, the spurious reflection E(t) does not spatially overlap with the signal-bearing beam 291 and also does not spatially overlap with the reflected signal-bearing beam 292 from the MO disk 107 (FIG. 3). Since the spurious reflection E(t) is spatially separated from the reflected signal-bearing beam 292, the differential detector 240 (FIG. 2) will be able to detect the components of reflected signal-bearing beam 292 without interference from the spurious reflection E(t).

In contrast, if an index-matching material is not coupled to the fiber launch end 615, then a refractive index difference exists in the interface between the fiber launch end 615 and the adjacent air space. As a result of this refractive index difference, the spurious reflection E(t) generated at the fiber launch end 615 will spatially overlap with the reflected signal-bearing beam 292. This undesired spurious reflection E(t) is then transmitted into the differential detector 240 (FIG. 2) along with the reflected signal bearing beam 292.

Cover Slip Technique for Reducing the Effects of Fiber Launch end 615 Reflections FIG. 9 illustrates another index matching approach for reducing the effects of the spurious reflection E(t) at the launch end 615 of optical fiber 108, in accordance with another embodiment of the present invention. A collimator 1050 includes a GRIN lens 1015 and a cover slip 1000 coupled to the optical fiber 108 and/or to a capillary 1055 that supports the optical fiber 108. The cover slip 1000 includes a back surface 1065 that is typically cemented to the optical fiber 108 (and to the supporting capillary 1055) with, for example, an optical cement having substantially the same refractive index as the cover slip. The cover slip 1000 may be formed from a material such as glass or other suitable material having a refractive index similar to that of the core of optical fiber 108.

As further shown in FIG. 9, the cover slip 1000 causes the spurious reflection E(t) to not occur at the fiber launch end 615. The spurious reflection E(t) will instead occur at the surface 1060 (a non-conjugate point) of cover slip 1000. As a result, the spurious reflection E(t) does not spatially overlap with the reflected signal-bearing beam 292 from the MO disk 107 (FIG. 3). Since the spurious reflection E(t) is spatially separated from the reflected signal-bearing beam 292, the differential detector 240 (FIG. 2) will be able to detect the components of reflected signal-bearing beam 292 without interference from the spurious reflection E(t).

In an alternative embodiment, the front surface 1060 of cover slip 1000 may also be AR-coated to reduce the Fresnel reflection at the surface 1060. The reflectance from AR-coated front surface 1060 may be, for example, on the order of about 0.25%.

As another alternative, the GRIN lens 1015 may also be AR-coated to further minimize reflection in the optical system in FIG. 9. Since the refractive index of cover slip 1000 (and corresponding mounting cement) are chosen to substantially match the refractive index of the core of optical fiber 108, the only reflection occurring in the optical system is the reflection from the AR-coated front surface 1060 of cover slip 1000. Since the front surface 1060 does not contain a conjugate point in the optical system of FIG. 9, the spurious reflection E(t) from front surface 1060 does not interfere with the signal-bearing beam 292, as mentioned above.

Fiber Head End Reflection

Reference is now made to FIG. 10 for discussion of the spurious reflection EH(t) that occurs at a fiber head end 900 of the optical fiber 108. The spurious reflection $E_H(t)$ is generated as a result of (1) the reflection of the outgoing beam 291 from the fiber surface 900 on the head end, or (2) from some other optical component surface on the head. The spurious reflection $E_H(t)$ propagates back towards the optical switch 104 and may interact with the return signal-bearing beam 292 to produce excess noise in the detection channel. The nature of the noise depends on the type of laser source used. If a FP diode laser is used, then mode partition noise (MPN) is the dominant source of noise. MPN arises because the spurious reflection $E_H(t)$ travels a slightly different optical path length before combining with the signal-bearing return light 292 in the detection module. If a DFB laser is used, then MPN is no longer of concern, but media noise may be amplified by mixing of the spurious reflection with the signal-bearing light. In addition, when using a DFB laser source, the small optical path difference may lead to excess laser phase noise. It is therefore important to implement a technique for eliminating (or significantly reducing) this unwanted spurious reflection from the head end.

Various techniques are now discussed for eliminating the effects of the spurious reflection $E_H(t)$ at the head end 900 of optical fiber 108. These techniques include index matching and coreless (or multi-mode) fiber splicing. These techniques are applicable while various types of laser sources 231, such as an FP laser or a DFB laser, are used to transmit light through the optical fiber 108.

Index Matching for Reducing the Effects of Fiber Head end 900 Reflections

Figure 11:
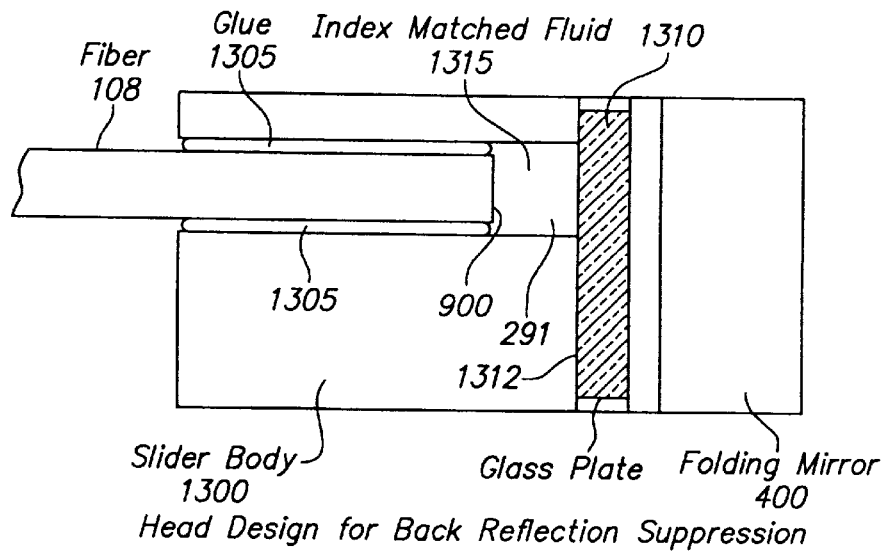
FIG. 11 illustrates an optical fiber including a head end face with a straight cleave or polish and coupled to a slider with an index matching fluid or epoxy, in accordance with another embodiment of the present invention.

In accordance with one embodiment of the present invention, the effect of the spurious reflection $E_H(t)$ from the head end 900 of fiber 108 is eliminated by an index matching approach. As shown in FIG. 11, a portion of the optical fiber 108 is attached into a slider 1300 by, for example, glue 1305. A glass plate 1310 is placed in the slider body 1300 at an orientation substantially perpendicular to the optical fiber 108. The gap between the fiber head end 900 and the glass plate 1310 is filled with epoxy, fluid or gel 1315 or other suitable material having a refractive index substantially the same as the refractive index of the core of the fiber. To the extent that the refractive index of the core of the fiber 108 does not match the refractive index of the index matching material 1315, a difference in the refractive indices of $\Delta n=\pm 0.05$ may be tolerated between the fiber 108 core and the index matching material 1315, thereby resulting in a maximum interface reflectivity of approximately 0.03%.

Figure 12:
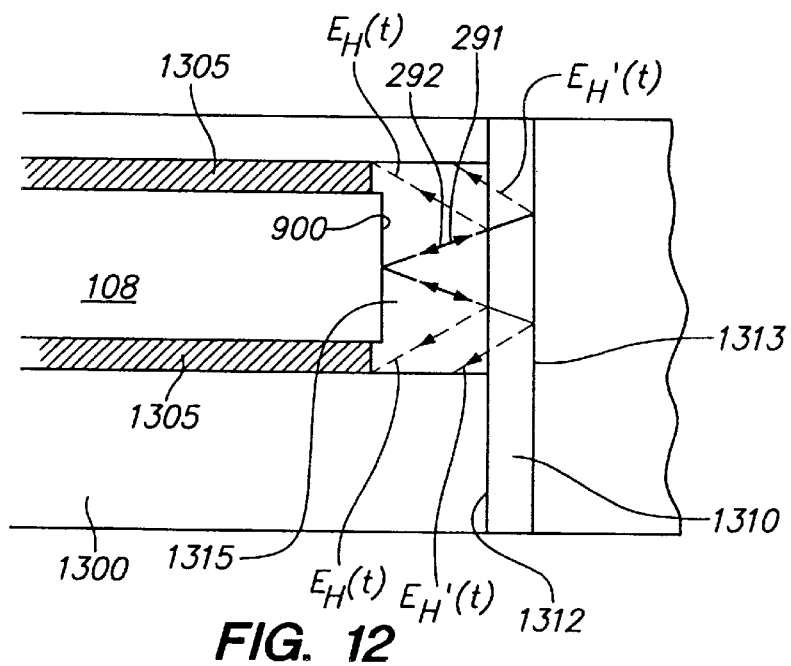
FIG. 12 illustrates the propagation of the signal-bearing beams and the spurious reflection in the optical system illustrated in FIG. 11.

As shown in FIG. 12, the index matched fluid 1315 causes the spurious reflection $E_H(t)$ to not occur at the fiber head end 900. The spurious reflection $E_H(t)$ will instead occur at a surface 1312 of glass plate 1310 (i.e., a non-conjugate surface), while a second spurious reflection $E'_H(t)$ will occur at non-conjugate surface 1313. As a result, the spurious reflections $E_H(t)$ and $E'_H(t)$ do not couple back into the fiber. Since the spurious reflections $E_H(t)$ and $E'_H(t)$ are effectively extinguished from the optical system, the differential detector 240 (FIG. 2) will be able to detect the components of reflected signal-bearing beam 292 without interference from the spurious reflections $E_H(t)$ and $E'_H(t)$.

Fiber Splicing for Reducing the Effects of Head end 900 Reflections $E_H(t)$

Figure 13A:
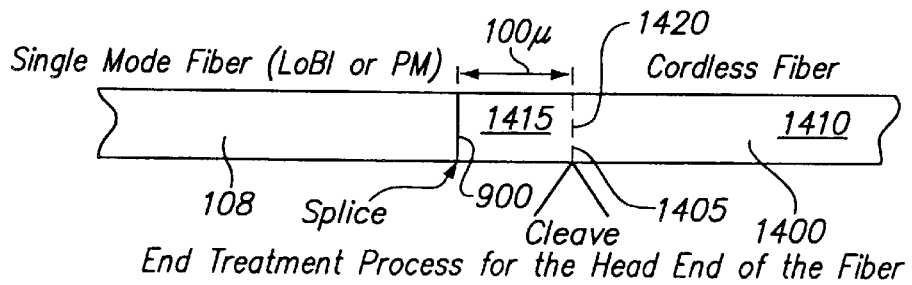
FIG. 13a illustrates an optical fiber with a head end spliced to a multi-mode fiber section, in accordance with another embodiment of the present invention.
Figure 13B:
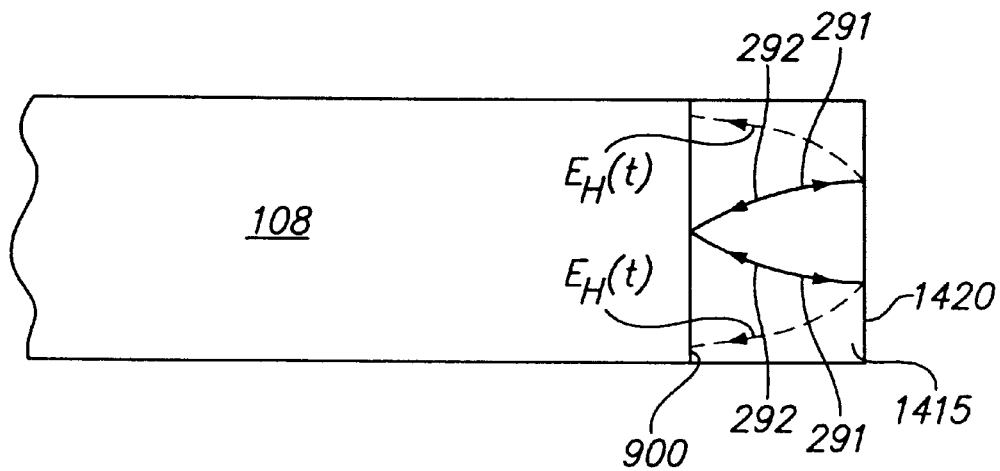

In accordance with another embodiment of the present invention, the effect of the spurious reflection $E_H(t)$ from the head end 900 of fiber 108 is eliminated by another type of index matching approach as discussed with-reference to FIGS. 13a to 13b. Referring first to FIG. 13a, a coreless fiber section 1400 is spliced on the head end of fiber 108. The coreless fiber section 1400 may, for example, have a diameter similar to that of single-mode fiber 108 (e.g., 80 microns), and is coupled to the fiber 108 by, for example, fusion splicing. The coreless fiber section 1400 is then cut along lines 1405 so that portion 1410 of coreless fiber section 1400 is separated from portion 1415. Thus, the portion 1415 remains spliced to the fiber 108.

In an alternative embodiment, a large-core multi-mode fiber (not shown) may be used in place of the coreless fiber. The length of spliced fiber portion 1415 is preferably chosen so that the radius of the outgoing beam 291 output at the face 1420 of portion 1415 is less than the diameter of coreless optical fiber 108. The portion 1415 may have a length of, for example, about 100 microns. If, during the splice process, the core size at the head end 900 (of optical fiber 108) changes due to the heating applied to the head end 900, then the effective mode field diameter and shape of optical fiber 108 will also change. As a result, a proper objective lens may optionally be implemented to compensate for these changes.

The refractive index of coreless fiber section 1400 (and portion 1415) substantially matches the refractive index of the core of optical fiber 108. To the extent that the refractive index of the core of the fiber 108 does not match the refractive index of the spliced fiber section 1415, a difference in the refractive indices of $\Delta n=\pm 0.05$ may be tolerated between the fiber 108 core and the spliced fiber section 1415, thereby resulting in a maximum interface reflectivity of approximately 0.03%. As a result, the effect of the reflection from a conjugate point (i.e., head end 900) is significantly reduced due to the index matching, as discussed below. If, in addition, AR coating is placed on the face of splice fiber surface 1420, then the Fresnel reflection from surface 1420 can be suppressed down to about 0.25%, resulting in a more efficient (i.e., lower loss) optical system in FIG. 10.

As shown in FIG. 13b, the spliced fiber portion 1415 causes the spurious reflection $E_H(t)$ to not occur at the fiber end face (head end 900). The spurious reflection $E_H(t)$ will instead occur at the interface between the surface 1420 and the adjacent air space. As a result, the spurious reflection $E_H(t)$ does not efficiently couple back into fiber 108 and is therefore effectively extinguished. Since the spurious reflection $E_H(t)$ is substantially eliminated from the optical system, the differential detector 240 (FIG. 2) will be able to detect the components of reflected laser beam 292 without interference from the spurious reflection $E_H(t)$.

Figure 13C:
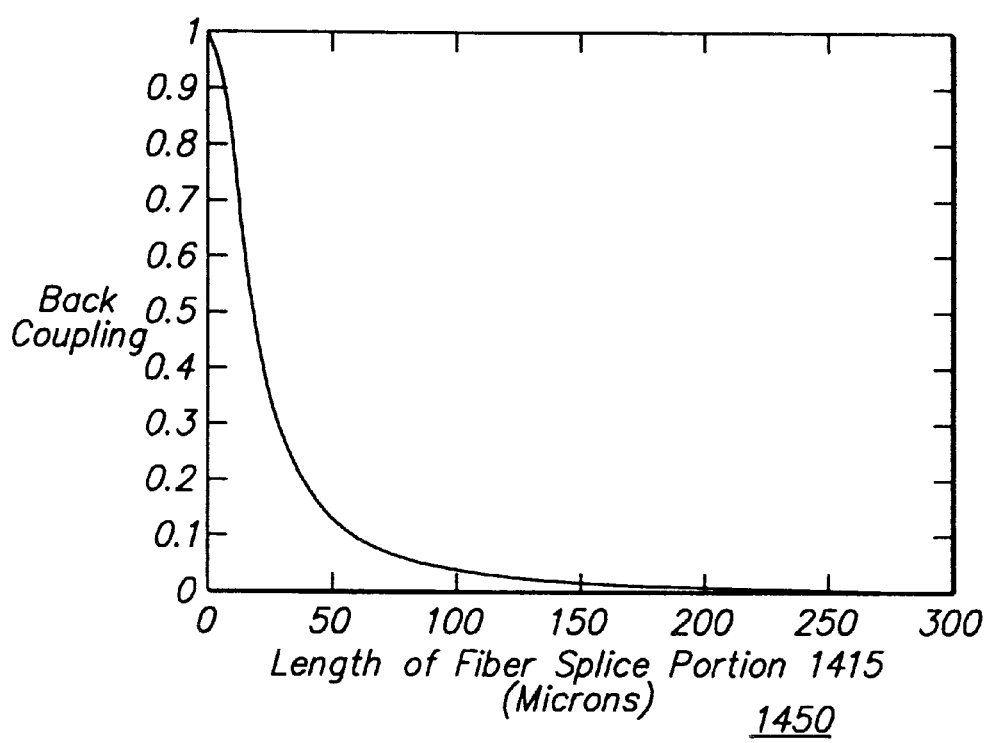
FIG. 13c is a graph showing the reflection at the fiber head end versus the length of a multi-mode fiber section that is spliced to an optical fiber.

FIG. 13c is a graph 1450 showing the reflection from the fiber head end 900 versus the length of the spliced fiber portion 1415. It is shown that the interference between the spurious reflection $E_H(t)$ at the fiber head end 900 and the laser beam 292 is substantially reduced if the spliced fiber portion 1415 has a length of at least approximately 100 microns.

In accordance with another embodiment of the present invention, the above-mentioned techniques for eliminating head end reflection are not required if the laser source 231 is implemented with a DFB laser and if both media noise and laser phase noise are sufficiently low in the optical system disclosed above.

It is understood that the present invention can find utility in a variety of environments, such as other types of optical drives, communication systems, and the like. Therefore, although the present invention has been described herein with reference to particular embodiments thereof, a latitude of modification, various changes and substitutions are intended in the foregoing disclosure, and it will be appreciated that in some instances some features of the invention will be employed without a corresponding use of other features without departure from the scope of the invention as set forth.

What is claimed is:

1. A system for propagating a first light signal between a laser source and a storage location, comprising:

an optical element disposed between the laser source and the storage location and adapted to transmit the first light signal generated by the laser source; and a controller connected to the laser source for pulsing the laser source on and off with a duty cycle of about fifty percent or less and with a modulation frequency determined by the equation $F=c(2i+1)/4Ln$, wherein c is a speed of light in a vacuum, L is a length of the optical element, n is a refractive index of the optical element, and i is an integer having a value of at least zero, in order to separate in time the first light signal and at least one spurious reflection, whereby interference between the first light signal and the at least one spurious reflection is reduced.

2. The system of claim 1 wherein the laser source is comprised of a Fabry-Perot laser.

3. The system of claim 2 wherein the Fabry-Perot laser is pulsed with a modulation frequency of at least approximately 200 Megahertz.

4. The system of claim 1 wherein the laser source is comprised of a stable single frequency laser source.

5. The system of claim 4 wherein the stable single frequency laser source includes a distributed feedback laser.

6. The system of claim 1 wherein the optical element is comprised of a polarization maintaining optical fiber.

7. A system for propagating a first light signal between a laser source and a storage location, comprising:

an optical element disposed between the laser source and the storage location and adapted to transmit the first light signal generated by the laser source; and a controller connected to the laser source for modulating the laser source at a particular frequency in order to reduce interference between the first light signal and at least one reflected light signal, wherein the particular frequency is determined by the equation $F=c(2i+1)/4Ln$, wherein c is a speed of light in a vacuum, L is a length of the optical element, n is a refractive index of the optical element, and i is an integer having a value of at least zero.

8. The system of claim 7 wherein the laser source is comprised of a Fabry-Perot laser.

9. The system of claim 8 wherein the Fabry-Perot laser is modulated at a frequency of at least approximately 200 Megahertz.

10. The system of claim 7 wherein the laser source is comprised of a stable single frequency laser source.

11. The system of claim 10 wherein the stable single frequency laser source includes a distributed feedback laser.

12. The system of claim 7 wherein the optical element is comprised of a polarization maintaining optical fiber.

13. The system of claim 7 wherein the controller pulses the laser source on and off with a duty cycle of about fifty percent or less.

14. A method of propagating a first light signal between a laser source and a storage location, comprising:

transmitting the first light signal across an optical element; and modulating the laser source at a particular frequency in order to reduce interference between the first light signal and at least one reflected light signal, wherein the particular frequency is determined by the equation $F=c(2i+1)/4Ln$, wherein c is a speed of light in a vacuum, L is a length of the optical element, n is a refractive index of the optical element, and i is an integer having a value of at least zero.

15. The method of claim 14 wherein the first light signal is generated by a Fabry-Perot laser.

16. The method of claim 15 wherein the step of modulating the Fabry-Perot laser at a particular frequency in order to reduce interference between the first light signal and at least one reflected light signal comprises the step of modulating the Fabry-Perot laser at a frequency of at least 200 Megahertz.

17. The method of claim 14 wherein the laser source is comprised of a stable single frequency laser source.

18. The method of claim 17 wherein the stable single frequency laser source includes a distributed feedback laser.

19. The method of claim 14 wherein the step of transmitting the first light signal across an optical element comprises the step of transmitting the first light signal across a polarization maintaining optical fiber.

20. The method of claim 14 wherein the step of modulating the laser source includes pulsing the laser source on and off with a duty cycle of approximately fifty percent or less.

21. An apparatus for directing light between a laser source and a storage location, comprising:

means for transmitting the first light signal across an optical element; and means for modulating the laser source at a particular frequency in order to reduce interference between the first light signal and at least one reflected light signal, wherein the particular frequency is determined by the equation $F=(2i+1)/4Ln$, wherein c is a speed of light in a vacuum, L is a length of the optical element, n is a refractive index of the optical element, and i is an integer having a value of at least zero.

22. The apparatus of claim 21 wherein the laser source is comprised of a Fabry-Perot laser.

23. The apparatus of claim 22 wherein the means for modulating the Fabry-Perot laser at a particular frequency in order to reduce interference between the first light signal and at least one reflected light signal comprises means for modulating the Fabry-Perot laser at a frequency of at least 200 Megahertz.

24. The apparatus of claim 21 wherein the laser source is comprised of a stable single frequency laser source.

25. The apparatus of claim 24 wherein the stable single frequency laser source includes a distributed feedback laser.

26. The apparatus of claim 21 wherein the means for transmitting the first light signal across an optical element comprises means for transmitting the first light signal across a polarization maintaining optical fiber.

27. The apparatus of claim 21 wherein the means for modulating the laser source includes means for pulsing the laser source on and off with a duty cycle of about fifty percent or less.

28. An apparatus for directing light between a laser source and a storage location, comprising:

means for transmitting the first light signal across an optical element; and means for pulsing the laser source on and off with a duty cycle of about fifty percent or less and at a frequency determined by the equation $F=c(2i+1)/4Ln$, wherein c is a speed of light in a vacuum, L is a length of the optical element, n is a refractive index of the optical element, and i is an integer having a value of at least zero, in order to separate in time the first light signal and at least one reflected light signal, whereby interference between the first light signal and the at least one reflected light signal is reduced.

29. The apparatus of claim 28 wherein the laser source is comprised of a Fabry-Perot laser.

30. The apparatus of claim 29 wherein the means for modulating the Fabry-Perot laser at a particular frequency in order to reduce interference between the first light signal and at least one reflected light signal comprises means for modulating the Fabry-Perot laser at a frequency of at least 200 Megahertz.

31. The apparatus of claim 28 wherein the laser source is comprised of a stable single frequency laser source.

32. The apparatus of claim 31 wherein the stable single frequency laser source includes a distributed feedback laser.

33. The apparatus of claim 28 wherein the means for transmitting the first light signal across an optical element comprises means for transmitting the first light signal across a polarization maintaining optical fiber.

* * * * *

UNITED STATES PATENT AND TRADEMARK OFFICE
CERTIFICATE OF CORRECTION

PATENT NO. : 6,538,974 B2
DATED : March 25, 2003
INVENTOR(S) : Jeffrey P. Wilde et al.

It is certified that error appears in the above-identified patent and that said Letters Patent is hereby corrected as shown below:

Column 10,
Line 50, "F=(2i+1)/4Ln" should read -- F=c(2i+1)/4Ln --.
Line 51, "i-0,1,2" should read -- 1 = 0,1,2 --.

Column 12,
Line 59, "EH(t)" should read -- $E_H(t)$ --.

Column 16,
Line 27, "F=(2i+1)/4Ln" should read -- F =c(2i+1)/4Ln --.

Signed and Sealed this

Twentieth Day of July, 2004

JON W. DUDAS
*Acting Director of the United States Patent and Trademark Office*